United States Patent [19]

Askins

[11] 4,101,780

[45] Jul. 18, 1978

[54] METHOD OF OBTAINING INTENSIFIED IMAGE FROM DEVELOPED PHOTOGRAPHIC FILMS AND PLATES

[75] Inventor: Barbara S. Askins, Huntsville, Ala.

[73] Assignee: The United States of America as represented by the Administrator of the National Aeronautics and Space Administration, Washington, D.C.

[21] Appl. No.: 694,406

[22] Filed: Jun. 9, 1976

[51] Int. Cl.[2] .......................... G03C 5/16; G03C 1/04; G03C 5/32; C09K 3/00

[52] U.S. Cl. .................................... 250/475; 96/27 R; 96/60 R; 252/301.1 R; 252/301.16

[58] Field of Search .................... 96/94 R, 45.1, 60 R, 96/27 R, 45.2, 58; 252/301 R; 250/321, 476, 433, 492, 475

[56] References Cited

U.S. PATENT DOCUMENTS 2,603,755 7/1952 De Ment .............................. 96/27 R

OTHER PUBLICATIONS

The Focal Encyclopedia of Photography, 1965; vol. 2; p. 1533.

*Primary Examiner*—Dennis E. Talbert, Jr.
*Assistant Examiner*—Alfonso T. Suro Pico
*Attorney, Agent, or Firm*—J. H. Beumer; John R. Manning; L. D. Wofford, Jr.

[57] ABSTRACT

A method of obtaining intensified images from silver images on developed photographic films and plates comprises the steps of converting silver of the developed film or plate to a radioactive compound by treatment with an aqueous alkaline solution of an organo-S35 compound; placing the treated film or plate in direct contact with a receiver film which is then exposed by radiation from the activated film; and developing and fixing the resulting intensified image on the receiver film.

12 Claims, No Drawings

METHOD OF OBTAINING INTENSIFIED IMAGE FROM DEVELOPED PHOTOGRAPHIC FILMS AND PLATES

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Autoradiographic image intensification is a process wherein the silver or other imaging material in a developed and fixed film or plate is converted to a radioactive compound and an intensified image is obtained on a receiver emulsion which is exposed by radiation from the activated film.

The autoradiograph reproduces the original image with increased density and contrast so that, in many cases, images which were invisible on the original plate or film are visible on the receiver emulsion. Autoradiography is used to obtain jan improved image from underexposed or underdeveloped films or plates, to obtain better images and more information from relatively less dense sections of a properly exposed and developed film or plate, to obtain a satisfactory image of an aged or faded film and to generally extend the limits of photographic sensitivity.

Films or plates which are amenable to autoradiographic intensification may seem to contain little or no useful information when examined visually or by photometric measurements. The information is stored in developed silver grains, the number of which is too small for appreciable visual or photometric detection. The number of silver grains may be smaller than that in a normal developed film because the film was accidentally underexposed or underdeveloped or because there was simply not enough light intensity available (e.g. in astronomy). Autoradiographic intensification retrieves the information stored in the low density silver grains by reproducing the original image with increased silver density, proportional to the original density, on the receiver film.

Autoradiography is described by M. Thackray in British Pat. No. 1,394,664 and "Autoradiography of Radioactive Photographic Images — Applications to Intensification, Restoration, Precision Etching, Photomechanical Reproduction and Photographic Research," Australian Atomic Energy Commission AAEC/E 317, ISBN 0 642 99656 3, September, 1974, and in various other references, including Dement, U.S. Pat. No. 2,603,775; and Hermann et al, East German Pat. No. 66559. The existing radiographic methods, however, have exhibited one or more serious shortcomings.

Prior chemical activation methods which use the beta-emitting isotope, sulfur-35, are all based on toning chemistry and have numerous disadvantages. The use of ionic sulfur-35 compounds to form radioactive silver sulfide is required. One modification of the method is to treat the original film with a solution of sodium or potassium sulfide or polysulfide ions labeled with the radioactive isotope, sulfur-35. Alternatively, the image silver is bleached to ionic silver halide and then treated with radioactive sodium sulfide-S35 solution. (See Thrackey, supra, Dement, Supra, and Hermann et al, supra.

Previously described methods for using sulfur-35 to make the image radioactive have disadvantages which severely limit (1) the extent to which the process can be used to intensify images, (2) the convenience with which the process can be used in an ordinary photographic laboratory, and (3) the practicality of adapting the process to batch or continuous processing.

The amount of intensification, i.e., increase in image-density to fog-density ratio of the autoradiograph as compared to the original negative, is severely limited because sulfide ions react with gelatin of the negative or positive as well as with photographic silver. The receiver film of the autoradiograph responds indiscriminately to radiation from silver and from gelatin. In areas of low silver density, as much or more radiation may be emitted from the gelatin as from the image silver.

Thackray, in British Pat. No. 1,394,664, described a method of rinsing the activated film with inactive sulfide solution, so that inactive sulfur ions exchange with sulfur compounds in the gelatin more rapidly than with the silver sulfide of the image to produce selective reduction of activity in the gelatin. This rinse results in some improvement in silver-to-gelatin activity ratio but does not eliminate the problem of extraneous radiation from S35 exchanged with the gelatin in the emulsion and also causes significant losses of activity from the silver. The method is difficult to use because the rinse time must be estimated for each type of original film to avoid removal of activity from the image silver. The deficiencies of this rinsing method are particularly apparent in attempts to enhance images in areas of very low densities.

Polysulfide ions also produce undesirable background activity because of the tendency to form colloidal solutions, which precipitate into the gelatin. A similar problem is encountered with the sodium sulfide method because during the bleach step some of the image silver is converted to colloidal silver sulfide, which settles out in the gelatin and produces undesirable background activity.

Therefore, prior art sulfur-35 image enhancement techniques are severely limited as to signal-to-noise increase or may even show a decrease in signal-to-noise ratio, thus producing the opposite of intensification.

The foregoing processes are also very sensitive to the pH of the radiotoning solutions, which must be controlled very carefully. This can be difficult and time consuming. With the polysulfide solutions, exposure to air oxidation also must be prevented.

Moreover, the sulfur-35 compounds used heretofore are chemically unstable and decompose rapidly to cause waste and inconvenience. The specific activity of the solutions must be kept relatively low to minimize radiolytic oxidation, but when low specific activity solutions are used for activation, the contact time to produce the autoradiograph is increased by hours or days. These solutions also give off highly toxic hydrogen sulfide gas. When the solutions contain radioactive sulfur, the gas evolved is radioactive. In the case of sodium sulfide, a primary decomposition product is sodium thiosulfate, which is a solvent for silver halide.

Any activating process which employs a bleach step has the disadvantage that the bleach time is judged by observing the color of the film as bleaching progresses. This is an empirical procedure requiring skill and experience and is difficult, if not impossible, to automate.

Thiourea has been used in photographic chemistry in several ways, but the use of thiourea - $S^{35}$, described in this application, is a new technique with different chemistry and for a different purpose. Thiourea has previously been used as a toner. (See C. E. Mees, *Theory of the Photographic Process,* Second Edition, 1954). The toning chemistry requires photographic silver to be converted to silver halide before adding an alkaline thiourea solution to convert the image to silver sulfide. Any intensification which occurs with the toning process is due to the color of the silver sulfide image as compared to the elemental silver image. Any intensification achieved in this way is very small compared to the very high level of intensification achieved with autoradiography due to the photographic effect of beta particles (from the thiourea - $S^{35}$) on the autoradiograph emulsion. Thackray, Supra, discloses use of thiourea in acidic solution as a silver sulfide solvent, which is also an entirely different application from the one described here.

Isotopes other than sulfur-35 all have one or more of the above disadvantages and additional objectional features, including high biological toxicity, undesirable gamma radiation which fogs nearby film and presents a health hazard, inconveniently long or short half-lives and relatively high cost. (See Thackray, AAEC/E 317, Appendix A for more detail.)

Autoradiographic image intensification by any of the prior art methods is a complicated procedure requiring some chemical skill and not easily adapted to ordinary photographic laboratories.

Nuclear reaction methods of making films radioactive, (E.G., neutron activation), are limited in usefulness by the specialized equipment required to produce the neutron or other radiation. Additionally, these methods usually activate impurity elements in the film as well as silver. Thus, background fog is increased and intensification is limited.

SUMMARY OF THE INVENTION

This invention relates to a method of post-process intensification of silver images on developed and fixed photographic film or plates comprising the steps of: (a) converting silver of the developed film or plate to a radioactive compound by treatment with an aqueous alkaline solution of an organo-$S^{35}$ compound; (b) placing said film or plate treated in step (a) in direct contact with a receiver film which is then exposed by radiation from the activated film; and (c) developing and fixing the intensified image on the receiver film.

This invention relates, in a process for obtaining an intensified image from a silver image on a conventionally developed film or plate comprising converting the silver thereon to a radioactive compound, placing the resulting activated film in direct contact with a film so as to expose the film and developing the exposed film, with the improvement of using an aqueous alkaline solution of an organo-$S^{35}$ compound to convert said silver to a radioactive compound. The improvement is based on the discovery that an aqueous alkaline solution of said organo-$S^{35}$ compound will react directly with photographic silver to produce activity levels suitable for autoradiography, without the silver first being bleached to silver halide as required by photographic chemistry literature, (See C. E. Mees, Supra). Although this invention is not to be understood as limited to a particular theory or mechanism, the mechanism is believed to involve the formation of silver sulfide-$S^{35}$ commplex intermediate when thiourea-$S^{35}$ is adsorbed to silver.

In a compositional aspect, this invention relates to an activating reagent for post-processing enhancement of silver images on conventionally-developed and fixed photographic films and plates consisting essentially of an aqueous alkaline solution of an organo-$S^{35}$ compound having an activity of 0.001–2.0 millicuries/milliliter.

It is the object of this invention to provide for an effective method of autoradiographic image intensification which can be used regardless of the original image density, which can be used in a typical photography laboratory and which is readily adaptable to batch or continuous processing. It is a further object of this invention to provide activating reagents which are stable to decomposition, can be used at conditions of high specific activity, give no toxic by-products, react selectively with photographic silver rather than with gelatin, react with silver without preliminary bleaching to silver halide, and do not precipitate colloidal sulfur.

DETAILED DESCRIPTION OF THE INVENTION

The film or plate from which an intensified image is to be obtained may have been developed several years before the autoradiographic image intensification. Fingerprints and other contaminants should be carefully removed, e.g., with a solution of 20% methanol. If there is a possibility that the original negative was not adequately fixed and washed, the negative should be rinsed in water, refixed and washed thoroughly.

Although not critical to the invention, it is preferred to pre-wash the film or plate, prior to the activation treatment, with an aqueous alkaline solution having approximately the same pH as the activating solution. An ammonium hydroxide solution is suitable for this purpose. Various other conventional washing or rinsing steps can be employed, for example rinsing with a 10 to 50 percent methanol solution, depending on surface conditions of the particular film or plate.

The activating reagent for converting silver of the developed film or plate to a radioactive compound is an alkaline solution of an organo-$S^{35}$ compound. In general, the organo-$S^{35}$ compound can be any organo-$S^{35}$ compound that reacts selectively with silver in a photographic film or plate. Organo-$S^{35}$ forms of thiourea and substituted thioureas are suitable for this purpose. Specific examples of organo-$S^{35}$ compounds that can be used are $S^{35}$ forms of thiourea, 1-methyl-2-thiourea, acetyl thiourea, phenyl thiourea, allyl thiourea, methyl thiourea, 1,1-dimenthyl thiourea, 1,3-dimethyl thiourea, 1,1,3-trimethyl thiourea, 1-ethanol-3-allyl thiourea, 1-ethanol-3-phenyl thiourea, and 1,3-dnbutyl thiourea. Thiourea-$S^{35}$ is preferred because of its effectiveness and ready availability as a stock item from isotope suppliers.

A sufficient amount of organo-$S^{35}$ compound is provided in the activating reagent to obtain the desired level of radioactivity. In general an activity level of 0.05 to 5 microcuries per square centimeter of film or plate surface can be used, and about one microcurie per square centimeter is preferred. Five millicuries, carefully used, will activate up to 5000 $cm^2$ of film or plate surface. The exact pH of the alkaline activating solution is not critical and can be adequately controlled without use of a pH meter by simply varying the amount and type of alkali added. A pH within the wide range of about 8 to 13 can be used, and a pH of 10 to 12 is preferred in most cases. The activation rate is faster when a higher pH solution is used, but for sensitive astronomical plates a pH of no higher than 11.1 is preferred to avoid reticulation. Background activity is at a minimum at low pH.

The desired pH can be conveniently obtained by using stock alkaline solutions such as a solution of 4 grams sodium hydroxide in one liter of water (approximately (0.1N) or 7 milliliters of 28% ammonium hydroxide diluted to one liter (approximately 0.1N). The former stock solution provides a pH of about 12 and the latter about 11. In a preferred procedure the activating reagent is prepared by adding stock alkaline solution to a solution containing an appropriate amount of organo-$S^{35}$ compound and diluting with distilled water, if necessary, to obtain the selected volume. The volume of activating solution should be the minimum amount required to adequately cover the film or plate. For an 8 × 10 inch print processing drum this will be about 100 milliliters. A typical activating solution would comprise 50 milliliters of organo-$S^{35}$ stock solution containing 10 microcuries activity per milliliter, 25 milliliters of stock alkaline solution and 25 milliliters of distilled water.

Conventional radioisotope techniques can be used in preparation and handling of the organo-$S^{35}$ solution. Appropriate safety measures and precautions are of course necessary when working with radioactive materials, but the precautions required for sulfur$^{35}$ are no more stringent than those required for some common laboratory reagents because sulfur$^{35}$ is a pure beta emitter with no gamma component.

Treatment of the film or plates with the activating solution can be carried out by placing the film or plate in a closed container such as a conventional photographic processing drum and adding the desired amount of solution so that it comes in contact with the film or plate. In a preferred procedure the container is subjected to agitation to ensure effective contact. Conventional laboratory agitators can be used for this purpose. Best results are obtained by using a color print processing drum with a sinusoidal agitator, which apparatus provides effective contact with minimum amount of liquid. Contact, with agitation, of the solution and the film or plate is maintained for a period of time sufficient to produce an activity level usable for obtaining and reproducing an intensified image in a receiver film, typically, 0.01 to 1 microcuries per square centimeter of film or plate surface. At least about thirty minutes is required at the preferred solution activity level. Shorter contact times can be used for higher levels of activity and higher pH solutions, and vice versa. This step can be carried out at ambient temperature, about 20° C, but higher temperatures are to be avoided. In the case of astronomical plates having sensitive emulsions a slightly lower temperature may be required to avoid reticulation. A useful technique for this purpose is placing the processing container in an ice-water bath at 12° to 15° C.

After the activating treatment the film or plate should be immediately subjected to thorough rinsing. Use of at least eight portions of water or other rinse solution or rinsing in running water for at least thirty minutes gives best results. The rinsed film or plate is then dried. At this point the activity level of the film or plate is preferably measured by an instrument such as a thin window Geiger counter. Activity readings can be used as a guide for estimating the length of time that a receiver film should be exposed to the activated film or plate.

An intensified image is obtained from the activated film or plate by placing it in direct contact with a receiver film. Exposure of the receiver film is essentially a contact printing process using beta particles instead of light. The invention is not limited to a particular type of film, inasmuch as sulfur 35 beta radiation will produce a useable image on almost any conventional film. Although other types of film can be used, it is preferred to use x-ray film, which has a fast response and large dynamic range in comparison to other types of film. Descriptions and properties of commercially available x-ray film are given in "Kodak Films for Industrial Radiography," Second Edition, (1974), supplement to "Radiography in Modern Industry," published by Eastman Kodak Company, Rochester, N.Y. 14650. Examples of suitable x-ray films include Kodak Type AA, Type M and Type R. Type AA film is relatively fast, that is, an exposure of approximately 0.1 roentgens would produce a density of one on the film when the film is processed manually in x-ray developer for five minutes at 20° C. Type M is a medium speed, medium grain x-ray film for which an exposure of 0.5 roentgens is required to produce a density of one when processed under the conditions given for Type AA. Type R is a slower, fine-grain film which requires an exposure of 1½ to 2 roentgens for a density of one under the same processing conditions. Another example of a suitable film is Ilford Type L-4 with 10 micron thick emulsion.

A fast x-ray film such as Kodak Type AA is conveniently used for the first autoradiograph, but better quality prints can be obtained on finer grain films including Kodak Type M and Kodak Type R x-ray films and Ilford Type L-4 nuclear emulsion. Exposure time will be selected, depending on the type of film and the level of activity. At preferred levels of activity an exposure time in the range of about 1 to 100 hours is suitable for most films.

When the exposure is complete, the autoradiographs are developed and fixed, using the appropriate conventional procedure and chemicals for the particular film. Conventional processes and materials for photographic development and fixation are described in Van Nostrand's *Scientific Encyclopedia,* Fourth Edition, (1968) at pages 1329 to 1331 and page 688. Specific formulations of reagents for these steps are given in Lange's *Handbook of Chemistry,* Revised Tenth Edition (1967), at page 1779, et. seg., and in other publications.

DESCRIPTION OF A PREFERRED EMBODIMENT

In a preferred embodiment, the original film or plate is pre-washed with distilled water for 5 minutes and with ammonium hydroxide solution of approximately the same pH as the activating solution for 5 minutes.

The prewashed film is processed for 30 minutes to 2 hours with an aqueous solution of thiourea-$S^{35}$ containing 2.5-5.0 microcuries/milliliter of activity, adjusted to pH about 11 with a stock solution of ammonium hydroxide.

The activated film is subjected to the following rinsing cycle:

Distilled Water: 5 minutes
20% Methonol: 5 minutes
50% Methanol: 5 minutes
Distilled Water: 5 times, 5 minutes each (The volume of each rinse should equal the volume of the processing solution.)

The dried film is placed in contact with Kodak Type R, single coated, x-ray film in a vacuum cassette for 1-100 hours and developed in trays using commercial x-ray developer, stop bath and fixer.

A preferred reagent in accordance with this invention is one in which the organo-$S^{35}$ compound is thiourea-$S^{35}$. The activity is 2.5-5.0 microcuries/milliliter, pH is about 11 and the specific activity of the thiourea-$S^{35}$ is 1.0-3.0 curies/gram.

Advantages of the method of this invention include:

1 The organo-sulfur-35 solution reacts preferentially with the image silver so that relatively small amounts of activity are measured in the gelatin after processing and rinsing. Therefore, base fog on the autoradiograph increases much more slowly than image density, which can be increased to the saturation point of the receiver film.

2. No colloidal compounds are formed in the solution, so that there is no problem caused by settling of colloidal sulfur in the gelatin of the emulsion.

3. The pH of the solution does not have to be controlled rigorously. A pH meter is unnecessary. Measuring the calculated amount of alkaline solution added to the processing solution is sufficient in most cases.

4. The image silver need not be converted to silver halide before processing. The extra time, inconvenience, inexactness and colloidal precipitation problems caused by the bleaching step in many toning reactions are thus avoided.

5. It is unncecessary to follow processing by exchange with a non-radioactive compound. The risk of removing activity from the image while removing it from the gelatin is eliminated.

6. Virtually no decomposition has been observed with thiourea-S35 solution kept in a closed amber bottle for over a month.

7. In contrast to previously used forms of $S^{35}$ such as sodium sulfide, thiourea does not appreciably evolve radioactive hydrogen sulfide at neutral or basic pH.

8. The specific activity of the compound is not limited by any chemical factors. High specific activity compounds, which produce high activity on the film or plate and require relatively shorter contact times for the autoradiograph, can be used.

9. The original film is not damaged by this process. In some cases, there may be a slight overall density reduction as measured by a densitometer, but no visible change is detectable.

10. Sulfur-35 is a pure beta emitter. No accompanying gamma radiation will fog nearby films or cause a health hazard. The beta radiation is soft, 0.167 MeV maximim, and requires no special protective shielding.

11. The half-life of sulfur-35 is 88 days. It is long enough for the activating solutions to last a reasonable time and for large numbers of autoradiographs to be made from an activated negative, but short enough that, if desired, radioactive wastes and negatives may be stored and allowed to become inactive with time to eliminate most disposal problems.

12. Nuclear Regulatory Commission regulations permit 1 curie of sulfur-35 per year to be disposed of through the sanitary sewer system provided that the concentration of the material after dilution by other sewage is no greater than $2\times10^{-3}$ microcurie per milliliter. (See Code of Federal Regulations, Title 10, Part 20, Paragraph 303.) For the amounts of work normally done in most laboratories, including darkrooms at observatories or research labs, the quantity of radioactive waste solutions is low enough that the solutions can be poured down the drain instead of into special holding tanks.

13. Beta radiation from sulfur-35 can be easily monitored with commercially available thin-window Geiger counters.

14. The process of this invention requires the preparation of only two or three stock solutions. A month's supply for normal usage can be prepared in less than one hour.

15. The process is simple and easily automated, because there are no steps requiring subjective judgement by the processor.

16. All the equipment needed to utilize this method is available from standard photographic, radiographic, chemical or nuclear suppliers. Thiourea-$S^{35}$ is a common stock item with many isotope suppliers.

17. Standard semi-automatic film and print processors can be used to semi-automate this process.

18. The use of the photographic drums in either the non-automated or semi-automated process assures very good contact between film and processing solution with relatively small amounts of solutions. Therefore, extremely dilute solutions are not required.

19. A further advantage of the invention is that it provides a means for extending the limits of photographic detection. As Dainty and Shaw suggest in their comprehensive analysis of image science (I. C. Dainty and R. Shaw, *Image Science,* Adademic Press, London, 1974, pp 147-148), ultimate sensitivity in photography will probably be achieved through a two-stage process where the second stage is an amplification of the first stage image. The availability of the second stage amplification means that detection at the first stage is freed from excessive concern for camera speed and can be done in a manner to optimize detective quantum efficiency (DQE). Dainty and Shaw show that the sensitivity of a high-DQE, low-speed process is fundamentally superior to a low-DQE, high-speed process at the first stage provided that adequate second stage amplification is available. Studies of several commonly used films show that they exhibit maximum DQE when the exposure is at a level which produces densities much less than those obtained on negatives developed by standard procedures. (See R. Clark Jones, Photgr. Sc. Engr. 2, 57, 1958). In the fields of astronomy and earth resources studies the availability of an effective second-stage process provides important practical applications. In astronomy, where faint images are routine, post-process intensification should increase the limits of detection and permit greater latitude in the choice of emulsions. In earth resources photographs there are often some underexposed areas, due to shade and sun angle, on otherwise correctly exposed negatives, and there are other times in aerial photography when proper exposure is impossible due to lack of light. Information may be recovered in these situations by autoradiographic intensification of low-density images.

20. Numerous other situations exist where there is a need for a method of extracting additional information from low-density photographs or low-density areas of photographs. In medical radiography, minimum exposure to x-rays or other radiation should be employed because of its harmful effects, and in some cases, such as x-ray diagnosis of women in an early stage of pregnancy, any dosage of x-rays is considered potentially dangerous. Post-process intensification would allow equivalent results to be obtained from low-density photographs obtained at lower exposures. Similar applications exist in the field of industrial radiography, where additional useful information could be obtained from low-density photographs.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following Examples, the temperatures are set forth uncorrected ° C; unless otherwise indicated, all parts and percentages are by weight.

EXAMPLE 1

The original negative was a 4 × 5 inch Plus-X film with step sensitometry as the image, which had been developed previously by conventional techniques. This film and others processed at the same time were placed in a color print processing drum and rinsed with 100 ml. portions of:

Distilled water: 2 minutes
Fixer F-5: (Formula available in standard photographic literature 2.5 minutes
Distilled water: 2 minutes, repeated once
20% Methanol: 2 minutes
50% Menthanol: 2 minutes
20% Menthanol: 2 minutes
Distilled water: 10 minutes, repeated once.

The temperature during the rinsing cycle was approximately 20° C.

The dried films were loaded into the processing drum. Stock isotope solution was prepared by diluting 5 millicuries of thiourea-$S^{35}$ of specific activity 1.13 millicuries per milligram to 500 milliliters with boiled, distilled water at room temperature (10 microcuries/milliliter). The processing solution was made from 50 ml. of thiourea-$S^{35}$ stock solution, 44 ml. of $NH_4OH$ stock solution (approximately 0.1 N) and 6 ml. of distilled water (pH about 11). The processing time with the thiourea-$S^{35}$ solution was 2 hours and 5 minutes. Rinses were:

Distilled Water 1 minute, repeated once
20% Methanol: 5 minutes
50% Methanol: 2 minutes
20% Methanol: 5 minutes
Distilled water: 5 minutes, 10 minutes, 10 minutes.

The activity of the dried film, checked with a Geiger counter, was approximately 0.5 microcuries/$cm^2$. The film was placed in contact with Kodak Type AA x-ray film in a spring-loaded cassette for 4 hours. The x-ray film was developed in a Kodak X-omat automatic processor.

Other autoradiographs were also made on Type AA x-ray film using exposure times of 2, 5.6, 9.6, 14 and 17.6 hours. Densities of the original before processing and the autoradiographs were measured with a MacBeth Sensitometer. Densities of the 2 and 17.6 hour exposed autoradiographs, as compared to the original negative, are shown in Table I.

Table I

| | Density Readings of Step Sensitometry Negatives | | |
|---|---|---|---|
| | Original Negative | Autoradiograph (4 hr. exposure) | Autoradiograph (17.6 hr. exposure) |
| Gross Fog | 0.11 | 0.20 | 0.21 |
| Step No. 1 | 0.24 | 0.40 | 0.75 |
| 2 | 0.33 | 1.00 | 2.16 |
| 3 | 0.45 | 1.56 | 3.12 |
| 4 | 0.59 | 2.03 | 3.74 |
| 5 | 0.73 | 2.39 | 4.19 |
| 6 | 0.86 | 2.67 | 4.57 |
| 7 | 0.99 | 2.93 | 4.90 |
| 8 | 1.13 | 3.10 | 5.12 |
| 9 | 1.26 | 3.21 | 5.38 |
| 10 | 1.40 | 3.33 | 5.63 |
| 11 | 1.51 | 3.46 | 5.80 |
| 12 | 1.63 | 3.50 | 5.88 |
| 13 | 1.73 | 3.52 | 5.87 |
| 14 | 1.83 | 3.56 | 5.86 |
| 15 | 1.93 | 3.61 | 5.90 |
| 16 | 2.03 | 3.65 | 5.94 |
| 17 | 2.13 | 3.65 | 5.95 |
| 18 | 2.22 | 3.65 | 5.97 |
| 19 | 2.29 | 3.68 | 6.01 |
| 20 | 2.36 | 3.71 | 6.04 |
| 21 | 2.46 | 3.80 | 6.12 |

Density values at each step were substantially increased, especially at the lower steps where the original negative densities would have been too low for reproducing image information by other methods. Gross fog underwent an initial increase primarily attributable to the greater base density of the x-ray receiver film as compared to the original plus-x film, but only a slight further increase after 17.6 hours exposure. The ratio of fog to image density was substantially decreased. The density increases shown above are typical of those obtained in the following other examples. The 2.5, 5.6, 9.6 and 14 hour exposed autoradiographs showed similar increases, approximately proportional to exposure time, except that the relative increase was less between 14 and 17.6 hours. Contrast, calculated as the slope of the straight line connecting points on the characteristic curve of density values of 0.25 and 2.0 above base fog, using extrapolation where necessary, showed increases from approximately 2 in the original negative to over 9 in the 17.6 hour exposed autoradiograph.

EXAMPLE 2

An underexposed negative from an earth resources experiment on Type 2424 Aerial Film had been developed previously. (The negative had been accidentally underexposed during an earth resources flight.)

The following pre-rinses were used:

Distilled water: 2 minutes
20% Methanol: 5 minutes

The film was processed without drying. The same thiourea-$S^{35}$ stock solution as in Example 1 was used. The processing solution was 50 ml. of the thiourea-$S^{35}$ solution, 25 ml. of $NH_4OH$ solution (approximately 0.1 N), and 25 ml. of distilled water (pH approximately 11). Processing time was one hour. Rinses were:

Distilled water: 1 minute, repeated once
20% Methanol: 5 minutes
50% Methanol: 5 minutes
20% Methanol: 5 minutes
Distilled water: 5 minutes, repeated once
Kodak Photo-flo solution: 30 seconds The activity of the dried film was approximately 0.07 microcuries/cm$^2$. An autoradiograph was made on Type R, single coated, x-ray film using a 69 hour contact time. Many features of the farmland, which was the subject of the photograph, became visible on the autoradiograph although they were not visible on the orginal negative. The density and contrast of the autoradiographs were of the magnitude which would be expected for a well exposed photograph of the scene.

EXAMPLE 3

An underexposed solar image on 35 mm Type SO-375 film, developed by unknown procedures, was obtained. The following pre-rinses were used:

Distilled water: 2 minutes
Fixer F-5, 70% solution: 3 minutes
Distilled water: 1 minute, repeated once
20% Methanol: 2 minutes
50% Methanol: 2 minutes
20% Methanol: 2 minutes
Distilled water: 5 minutes, repeated once.

The processing solution was: 50 ml. of the thiourea-$S^{35}$ solution used in Examples 1 and 2; 25 ml. of NaOH stock solution (approximately 0.1N); 25 ml. of distilled water (pH approximately 12.4). Processing time was 1 hour.

Rinses were:

Distilled water: 1 minute, repeated once
20% Methanol: 5 minutes
50% Methanol: 5 minutes
20% Methanol: 5 minutes
Distilled water: 5 minutes, repeated once.

The activity of the dried film was approximately 0.02 microcuries/cm$^2$. An autoradiograph was made on Type R x-ray film using a 90 hour contact time. The density and contrast and the amount of visible detail was much better on the autoradiograph than on the original.

EXAMPLE 4

A II-a-D astronomical plate with argon calibration lines and spectral lines from the Orion Nebula was obtained. It had been developed by hand in Kodak D-19 developer (formula available in standard photographic literature) for 3 minutes at 75° F. This plate was processed without pretreatment. The stock isotope solution was made by diluting 5 millicuries of thiourea-$S^{35}$, specific acitivity 1.5 millicuries per milligram, to 500 ml. with boiled, distilled water. The processing solution was 25 ml. thiourea-$S^{35}$ solution, 25 ml. $NH_4OH$ stock solution (approximately 0.1N) and 50 ml. distilled water (pH approximately 11). Processing time was 1.5 hours. Rinses were:

Distilled water: 1 minute, repeated once,
50% Methanol: 10 minutes
10% Methanol: 10 minutes
Distilled water: 5 minutes, repeated once The activity of the dried plate was approximately 0.5 microcuries/cm$^1$. An autoradiograph was made on Type AA x-ray film with a contact time of 19 hours. The x-ray film was developed in trays using Kodak x-ray Developer, Kodak Indicator Stop Bath and Kodak x-ray Fixer. Development time was 6.5 minutes at 17° C. and fixing time was 13 minutes. All the spectral lines were much stronger on the autoradiograph than on the original. One line which was virtually invisible on the original was easily visible on the autoradiograph.

EXAMPLE 5

A spectral image of Comet West was recorded on a II-a-D astronomical plate. The plate was developed in Kodak D-19 developer for 23 minutes at 74° F. The plate was given the following pre-treatment, using 100 ml. portions for each step: Rinse in 50% solution of F-5 fixer and rinse six times in distilled water for a total of 15 minutes.

A stock thiourea-$S^{35}$ solution was prepared by diluting 5 millicuries of thiourea-$S^{35}$, of specific activity 3.41 curies/gram, to 250 ml, with boiled distilled water. The activating solution was prepared by mixing 50 ml. of the thiourea-$S^{35}$ stock solution with 25 ml of $NH_4OH$ stock solution and 25 ml of distilled water (resulting pH approximately 11). The plate was contacted with the activating solution under agitation for 30 minutes. The activated plate was then rinsed as follows: distilled water—2, 2 minutes; 20% methanol — 5 minutes; distilled water — 2, 5, 5, 5, 5 minutes.

The activity of the plate was approximately 0.1 microcuries per cm$^2$. An autoradiograph was made by placing the plate in contact with Type M x-ray film for 5 ⅔ hours. Analysis of spectra on the autoradiograph after development revealed that its information content was approximately double that of the original plate.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of obtaining intensified images from silver images on developed films or plates comprising the steps of:

(a) converting silver of the developed film or plate to a radioactive compound by contacting said film or plate with an aqueous alkaline solution of an organo-$S^{35}$ compound selected from the group consisting of thiourea-$S^{35}$ and substituted thiourea-$S^{35}$ compounds;

(b) placing said film or plate treated in step (a) in direct contact with a receiver film whereby said receiver film is exposed by radiation from said radioactive compound; and (c) developing and fixing the resulting intensified receiver film.

2. The method of claim 1, wherein the organo-$S^{35}$ compound is thiourea-$S^{35}$.

3. The method of claim 1, wherein the organo-$S^{35}$ compound is applied at a level of 0.05–5 microcurie/cm$^2$ of said film treated in step (a).

4. The method of claim 1, wherein said film or plate, after treatment in step (a), has an activity of 0.01–1 microcuries/cm$^2$.

5. The method of claim 1, wherein the pH of said aqueous alkaline solution is from 8 to 13.

6. The method of claim 1 wherein the pH of said aqueous alkaline solution is from 10 to 12.

7. The method of claim 1 wherein said alkaline solution is contacted with said plate for a period of at least 30 minutes.

8. The method of claim 1 wherein said treated film or plate is maintained in direct contact with said received film for a period of 1 to 100 hours.

9. The method of claim 1 wherein said film or plate, prior to treatment in step (a), is washed with an aqueous alkaline solution having approximately the same pH as said solution containing an organo-$S^{35}$ compound.

10. The method of claim 1 wherein said receiver film is an x-ray film.

11. The method claim 1 wherein said film or plate, after treatment in step (a) and prior to being placed in contact with said receiver film, is thoroughly rinsed.

12. The method of claim 1 wherein the level of radioactivity of said film or plate is measured prior to being placed in contact with said receiver film.

* * * * *